United States Patent [19]
Ballman

[11] 3,781,630
[45] Dec. 25, 1973

[54] MEANS AND METHODS FOR FERRO-RESONANT FLOAT CHARGING CIRCUITS

[76] Inventor: Gray C. Ballman, 30 Portland Pl., St. Louis, Mo. 62131

[22] Filed: July 10, 1972

[21] Appl. No.: 269,997

[52] U.S. Cl. .................. 320/21, 320/39, 323/48, 323/22 SC, 323/61
[51] Int. Cl. ............................................. H02j 7/04
[58] Field of Search .................. 320/39, 21, 40, 37, 320/38, 4, 10, 21; 323/44, 45, 22 SC, 48, 61; 321/16

[56] References Cited
UNITED STATES PATENTS
| | | | |
|---|---|---|---|
| 3,440,519 | 4/1969 | Macemon | 323/48 X |
| 3,086,159 | 4/1963 | Daly | 320/39 |
| 3,521,147 | 7/1970 | Ostreicher | 320/39 |
| 3,090,904 | 5/1963 | Jensen | 320/37 |
| 3,573,606 | 4/1971 | Hart et al. | 323/60 |
| 2,978,633 | 4/1961 | Medlar | 320/39 X |

Primary Examiner—J. D. Miller
Assistant Examiner—Robert J. Hickey
Attorney—Joseph A. Fenlon, Jr.

[57] ABSTRACT

The invention comprises a circuit in which a ferro-resonant transformer is used to control operation of a battery charger in which the voltage supplied to the charging circuit by a first secondary winding in the transformer is regulated by a second independent winding in said transformer so long as current flows in said secondary winding, and in which the current flowing in the secondary winding is controlled by the means of a triac inserted in a second independent circuit which includes the secondary winding and which is operative by means of electronic switching devices contained in the charging circuit which are responsive to the charge status of the battery being charged as determined by the terminal voltage of said battery.

9 Claims, 1 Drawing Figure

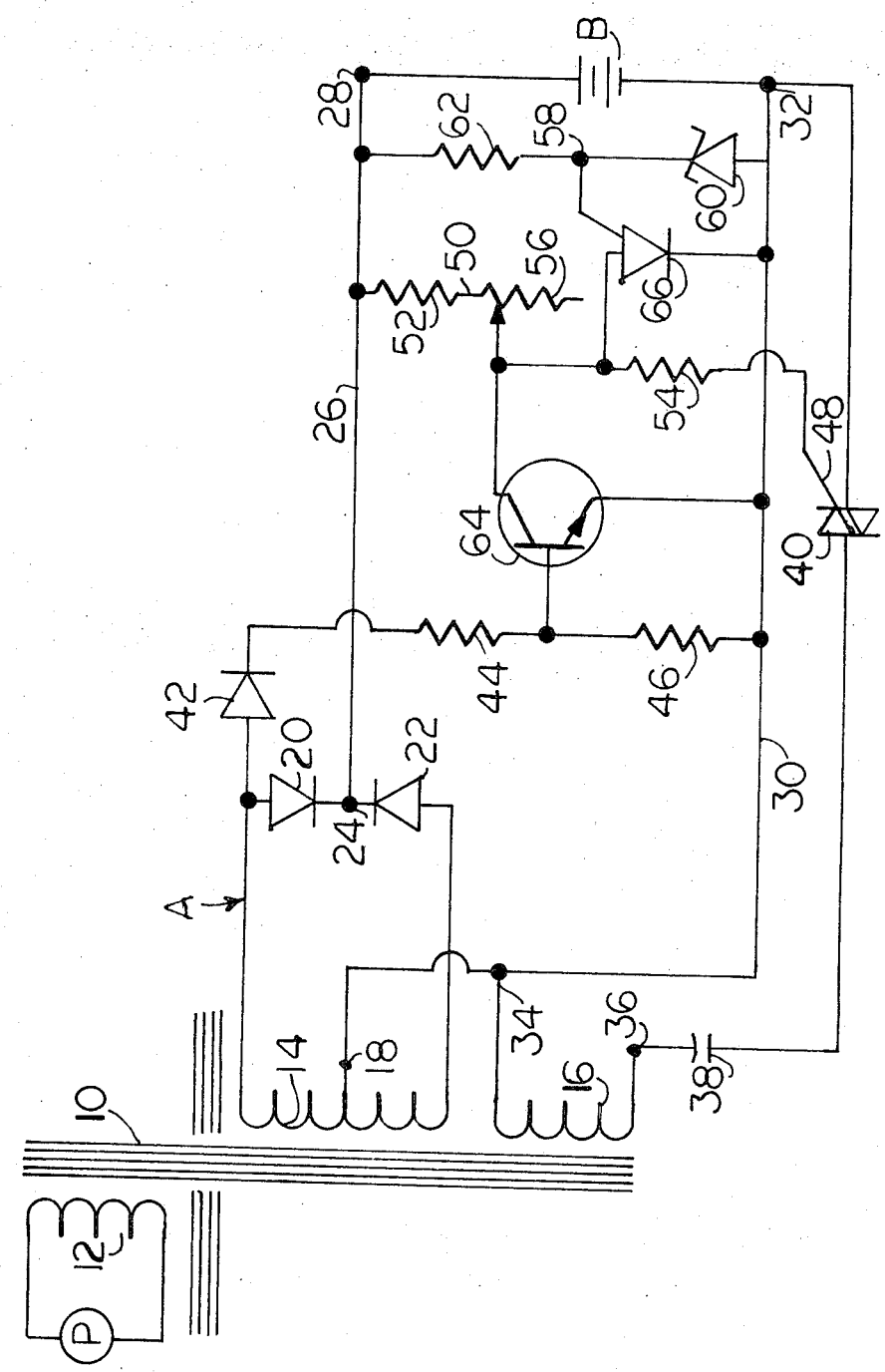

MEANS AND METHODS FOR FERRO-RESONANT FLOAT CHARGING CIRCUITS

It is the object of this invention to provide a unique and novel float charging device.

With the above and other objects in view which will become immediately apparent upon reading the Specification and examining the drawing, my invention resides in the unique and novel form, arrangement, construction and combination of parts shown in the drawing, described in the specification and claimed in the claims.

IN THE DRAWINGS

The FIGURE represents an electrical schematic of a preferred embodiment of my invention.

Referring now in more detail and by reference character to the drawing which illustrates a preferred embodiment of my invention, A designates a float control device including a ferro-resonant transformer 10 provided with a primary winding 12 connected to a source of alternating current power P and first and second secondary windings 14 and 16 respectively, the winding 14 being conventionally provided with a centertap 18. Connected across the winding 14 is a pair of opposing diodes 20, 22, connected together at their common cathodes 24 to a positive bus 26 to which is also connected a positive output terminal 28. Connected to the centertap 18 is the negative bus 30 to which is connected the negative output terminal 32 and one leg 34 of the second secondary winding 16. The other leg 36 of the secondary winding 16 is connected to the negative output terminal 32 through a capacitor 38 and a triac 40 which are in series with each other. Connected to the anode of the diode 20 is the anode of a blocking diode 42, the cathode of which is connected to the negative bus 30 through series resistors 44 and 46. Connected between the positive bus 26 and the gate lead 48 of the triac 40 is a voltage divider circuit 50 comprising a pair of fixed resistors 52, 54, and a variable resistor 56. Connected between the positive bus 26 and the negative bus 30 is a voltage reference circuit 58 comprising a Zener 60 and a dropping resistor 62.

Two electronic switching devices, a transistor 64 and a primary unijunction transistor (PUT) 66, are provided for controlling the operation of the circuit. The collector of the transistor 64 is connected to the variable resistor 56 and the anode of the PUT 66. The base of the transistor 64 is connected to the common junction of the resistors 44 and 46. The emitter of the transistor 64 is connected to the negative bus 30. The cathode of the PUT 66 is also connected to the negative bus 30. The gate lead of the PUT 66 is connected to the anode of the Zener 60.

OPERATION

In operation, the transistor 64 acts as a resetting device which turns on every half cycle as voltage from the winding 14 is transferred to the base of the transistor 64 through the blocking diode 42. The PUT 66 stays out of conduction until such time that the battery B terminal voltage attains a fully charged status at which time the voltage at the anode of the PUT 66 becomes sufficiently positive (the voltage is transferred from the battery B through voltage divider circuit 50 which includes resistors 52, 54 and 56 and the gate to ground resistance of the Triac 40) to initiate conduction, the voltage at the gate being constant because of the Zener 60 and the cathode being directly connected to the negative bus 30. However, once the PUT 66 starts conduction, it should be noted that such conduction occurs only when transistor 64 is not conducting, because conduction of the transistor 64 causes the voltage drop through the resistors 52 and 56 to increase and biases the PUT 66 out of conduction. Thus it should be first apparent that when the battery B attains full charge, the transistor 64 and PUT 66 alternately conduct, each one conducting for approximately a half cycle of time.

Also it should be noted that when the battery B is not fully charged, the PUT 66 does not conduct at any time and transistor 64 conducts only during the positive half cycle at the anode of the diode 20.

The triac 40 is a bilateral current passing device which permits current to flow freely in opposing directions so long as the gate 48 remains sufficiently positive with respect to the voltage at the line leads. When PUT 66 is not conducting, the voltage at the triac gate 48 (whether or not transistor 64 is in conduction) is sufficiently positive to have the triac 40 in continuous conduction. When PUT 60 conducts, the gate 48 is biased to cutoff and the triac stops conducting and the circuit which includes secondary winding 16 becomes an open circuit.

It should be noted here that the first and second secondary windings 14 and 16 are balanced windings in the ferro-resonant transformer 10, the winding 16 being the winding through which a small amount of current flows, and the winding 14 carrying the substantial current required to operate the charger. As long as the circuit which includes the second secondary winding 16 is a closed circuit, the capacitor 38 presents a balanced capacitive load to the transformer 10 and large quantities of current can be delivered to the charger by the first secondary winding 14 without saturating the transformer 10. However, once the capacitive effect of the second secondary winding circuit is removed, the saturable nature of the transformer 10 prevents large amounts of current from being supplied to the battery from the secondary winding 14. This is accomplished by selecting a transformer 10 in which the first secondary winding 14 will not attain the terminal voltage of the battery B except when the second secondary winding 16 is conducting. This circuit utilized also provides a high degree of regulation in that it has been found that charging current remains substantially constant notwithstanding large changes in input line voltage from the power source P.

Thus it should be apparent that the circuit disclosed provides a ferro-resonant float charging device in which full wave rectified charging power is supplied to a battery until such time as the battery becomes charged. Thereafter, the PUT 66 and the transistor 64 alternately remain in conduction to prevent overcharging by opening the second secondary winding circuit and limiting the voltage supplied to the battery from the first secondary winding. The transistor 64 resets the triac 40 and the PUT 66 every half cycle so that when the charge of the battery recedes, the charger is again automatically turned on until full charge is again reached.

It should be understood that changes and modification in the form, construction, arrangement and combination of the various parts and elements shown herein may be made without departing from the nature and principle of my invention.

Having thus described my invention, what I claim and desire to secure by Letters Patent is recited in the following claims:

1. A float charging device comprising
a ferro-resonant transformer including a primary winding for supplying power and a first and second secondary winding,
charging means operatively connected to said first winding for supplying charging power to a battery from said transformer,
control means operatively connected to said second winding and including a capacitor and a switching means, and a triac in series with the secondary winding and also including a switching means,
said switching means being operatively connected to the charging means and being responsive to the terminal voltage of the battery being charged,
said switching means being adapted for automatically cutting off current flow in the second secondary winding when the battery terminal voltage attains a preselected magnitude, and for permitting current to flow through said second secondary winding at all other times.

2. The device of claim 1 in which the control means includes a capacitor and a triac in series with the second secondary winding.

3. The device of claim 1 in which the control means includes a capacitor and a triac in series with the second secondary winding and the switching means includes a first electronic switch which goes into conduction when the battery attains the preselected terminal voltage, and which conduction biases the triac into a state of non-conduction causing the secondary winding circuit to open and removing the capacitive load from the transformer.

4. The device of claim 1 in which the switching means also includes a second electronic switch which resets the first electronic switch each half cycle whereby to provide continuous monitoring of the battery terminal voltage.

5. A float charging device comprising
a ferro-resonant transformer including a primary winding and first and second secondary windings, the first secondary winding being provided with a centertap,
a positive bus and a negative bus,
first and second rectifying diodes connected at their anodes respectively to opposing legs of the first secondary winding and at their cathodes to the positive bus,
said centertap being connected to said negative bus,
a voltage reference circuit including a Zener and a first resistor connected between the positive and negative bus,
a voltage divider circuit operatively connected between the positive and negative bus and including a variable resistor and the gate to ground resistance of a triac,
a triggering circuit operatively connected between one leg of the first secondary winding and the negative bus and including a voltage monitoring point,
first switching means provided with a first lead connected to the Zener anode and a second lead connected to the negative bus and also being provided with a third lead connected to the voltage divider circuit, said first switching means for initiating conduction therein when the voltage differentials between the voltage at the three leads thereof indicates that the battery terminal voltage has attained a predetermined magnitude,
second switching means including a first lead connected to the voltage divider circuit and a second lead connected to the negative bus and also including a third lead to the triggering circuit at the voltage monitoring point, said second switching means for going into conduction during every positive half cycle of voltage across the first secondary winding whereby to reduce the voltage presented to the third lead of the first switching means from the voltage divider circuit when the second switching means is in conduction,
and a capacitor connected in series with the line leads of the triac and the second secondary winding, the voltage at the gate of the triac being such that the triac will be normally in conduction and will remain in conduction until the first switching means goes into conduction at which time the current drawn through the voltage divider circuit will cause the voltage at the triac gate to be biased below cutoff,
said first and second secondary windings being so constructed and adapted that the second secondary winding will supply a resonant capacitive load to the transformer when the triac is in conduction, and the first secondary winding will supply battery charging power to the battery so long as the secondary windings are in resonant conduction.

6. The device of claim 5 wherein the first switching means is a primary unijunction transistor, the first lead being the gate thereof, the second lead being the cathode thereof, and the third lead being the anode thereof.

7. The device of claim 5 wherein the second switching means is a transistor, the first lead being the collector thereof, the second lead being the emitter thereof, and the third lead being the base thereof.

8. The device of claim 5 wherein the second switching means is a means for turning off conduction of the first switching means and simultaneously turning on conduction of the triac every half cycle.

9. A float charging device comprising
a ferro-resonant transformer including a primary winding for supplying power and a first and second secondary winding,
charging means operatively connected to the first winding for supplying charging power to a battery from the transformer,
control means operatively connected to the second secondary winding for providing a capacitive load to the transformer during conduction of current in the second secondary winding,
an automatic switching means for cutting off flow of current in the second secondary winding when the battery terminal voltage attains a preselected magnitude,
said switching means including a first electronic switch which goes into conduction when the battery attains the preselected terminal voltage, and a second electronic switch which resets the first electronic switch each half cycle whereby to provide continuous monitoring of the battery terminal voltage.

* * * * *